(12) United States Patent
Downs et al.

(10) Patent No.: US 8,167,758 B2
(45) Date of Patent: May 1, 2012

(54) DRIVE AXLE ASSEMBLY WITH GEAR MESH LUBRICATION SYSTEMS FOR LUBRICATING GEAR MESH AND/OR DIFFERENTIAL BEARINGS

(75) Inventors: James P Downs, South Lyon, MI (US); Herbert L Adams, III, Waterford, MI (US); W. Gordon Hunt, Luna Pier, MI (US); Gregory E Woodside, Troy, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 630 days.

(21) Appl. No.: 12/315,961

(22) Filed: Dec. 8, 2008

(65) Prior Publication Data

US 2010/0144480 A1    Jun. 10, 2010

(51) Int. Cl.
| | |
|---|---|
| F16H 57/04 | (2010.01) |
| F16N 7/26 | (2006.01) |
| F16N 7/28 | (2006.01) |
| F01M 1/00 | (2006.01) |
| F01M 9/06 | (2006.01) |

(52) U.S. Cl. ...... 475/160; 475/159; 184/6.12; 184/11.1; 184/13.1

(58) Field of Classification Search ............ 475/159, 475/160; 184/6.12, 11.1, 13.1
See application file for complete search history.

(56) References Cited

U.S. PATENT DOCUMENTS

| | | | |
|---|---|---|---|
| 1,176,936 A | 3/1916 | Waldon | |
| 1,631,217 A * | 6/1927 | Matthews | 184/13.1 |
| 1,921,769 A | 8/1933 | Morgan | |
| 2,015,108 A | 9/1935 | Harper | |
| 2,037,173 A | 4/1936 | Matthews | |
| 2,191,833 A * | 2/1940 | Russell | 184/11.1 |
| 2,840,186 A | 6/1958 | Nyland | |
| 2,860,726 A * | 11/1958 | Thomas et al. | 184/11.1 |
| 2,908,351 A | 10/1959 | Daley, Jr. | |
| 3,138,222 A | 6/1964 | Dames | |
| 3,182,527 A | 5/1965 | Bryan | |
| 3,618,711 A * | 11/1971 | Vollmer | 184/6.12 |
| 3,838,751 A * | 10/1974 | Brown | 184/6.12 |
| 4,242,923 A | 1/1981 | Nishikawa et al. | |
| 5,161,644 A * | 11/1992 | Swenskowski et al. | 184/6.12 |
| 5,273,136 A | 12/1993 | Martin et al. | |
| 5,316,106 A | 5/1994 | Baedke et al. | |
| 6,398,687 B2 | 6/2002 | Iwata | |
| 6,997,284 B1 * | 2/2006 | Nahrwold | 184/6.12 |

FOREIGN PATENT DOCUMENTS

GB    1115446    5/1968

* cited by examiner

*Primary Examiner* — Tisha Lewis
(74) *Attorney, Agent, or Firm* — Harness, Dickey & Pierce, P.L.C.

(57) ABSTRACT

An axle assembly having an axle assembly with first and second sumps for holding a lubricant. A rotating ring gear associated with a differential can rotate through the lubricant in the first sump to cause a portion of the lubricant to cling to the ring gear. A portion of the lubricant that has clung to the ring gear can be removed from the ring gear and transferred to the second sump. The lubricant in the second sump can be drained to lubricate teeth of a pinion that is in meshing engagement with the ring gear and/or to lubricate bearings that support the pinion. A related method is also provided.

23 Claims, 5 Drawing Sheets

DRIVE AXLE ASSEMBLY WITH GEAR MESH LUBRICATION SYSTEMS FOR LUBRICATING GEAR MESH AND/OR DIFFERENTIAL BEARINGS

INTRODUCTION

The present disclosure generally relates to axle assemblies. More particularly, the present disclosure relates to a method for lubricating the differential gearset and/or the support bearings in a differential in an axle assembly and a related axle assembly.

Conventional axle assemblies employ a splash lubrication system in which a ring gear is rotated through a lubricant contained in a sump and slung radially outwardly to lubricate various portions of the axle assembly. U.S. Pat. No. 2,908,351 appears to disclose an axle assembly with a rotary type fluid pump for lubricating the gears and bearings of an axle assembly. While such lubricating system is suited for its intended purpose, we note that incorporation of a fluid pump into an axle assembly can be relatively expensive. Consequently, there remains a need in the art for an axle assembly with an improved lubrication system.

SUMMARY

This section provides a general summary of some aspects of the present disclosure and is not a comprehensive listing or detailing of either the full scope of the disclosure or all of the features described therein.

In one form, the present teachings provide an axle assembly that includes an axle housing, a ring gear, a differential, a pinion, and an auxiliary means for collecting lubricant. The axle housing has an internal cavity, a portion of which forms a first sump. The ring gear is mounted in the internal cavity for rotation about a first axis. The ring gear is rotatable through the first sump to cause a lubricant in the first sump to cling to the ring gear. The differential is coupled to the ring gear for rotation therewith about the first axis. The pinion is mounted in the internal cavity of the axle housing for rotation about a second axis that is perpendicular to the first axis. The pinion includes a plurality of teeth that are meshingly engaged to a plurality of teeth formed on the ring gear. The auxiliary collecting means is configured to collect a portion of the lubricant that has clung to the ring gear as it rotates in a predetermined rotational direction through the first sump. The auxiliary collecting means has a second sump and a drain. The second sump is disposed in the internal cavity and is discrete from the first sump. The drain is configured to at least partly drain the second sump directly onto at least one of the teeth of the pinion and the teeth of the ring gear.

In another form, the present teachings provide a method for operating an axle assembly. The method includes: providing an axle housing having an internal cavity, a portion of the internal cavity forming a first sump; mounting a pinion in the axle housing, the pinion having a plurality of teeth; mounting a differential assembly in the axle housing, the differential assembly including a ring gear and a differential, the ring gear having a plurality of teeth that are meshingly engaged to the teeth of the pinion; rotating the ring gear in a predetermined rotational direction through a lubricant in the first sump to cause the lubricant in the first sump to cling to the ring gear; collecting a portion of the lubricant that has clung to the ring gear in a second sump that is elevated above the first sump; and draining a portion of the lubricant in the second sump directly onto at least one of the teeth of the pinion and the teeth of the ring gear.

In a further form, the present teachings provide a method for operating an axle assembly. The method includes: providing an axle housing having an internal cavity, a portion of the internal cavity forming a first sump; mounting a pinion in the axle housing, the pinion having a plurality of teeth; mounting a differential assembly in the axle housing, the differential assembly including a ring gear and a differential, the ring gear having a plurality of teeth that are meshingly engaged to the teeth of the pinion; rotating the ring gear in a predetermined rotational direction through a lubricant in the first sump to cause the lubricant in the first sump to cling to the ring gear; and scraping a portion of the lubricant that has clung to the ring gear and dispensing the scraped portion of the lubricant directly onto at least one of the teeth of the pinion and the teeth of the ring gear.

Further areas of applicability will become apparent from the description provided herein. It should be understood that the description and specific examples in this summary are intended for purposes of illustration only and are not intended to limit the scope of the present disclosure, its application and/or uses in any way.

BRIEF DESCRIPTION OF THE DRAWINGS

The drawings described herein are for illustrative purposes only and are not intended to limit the scope of the present disclosure in any way. The drawings are illustrative of selected teachings of the present disclosure and do not illustrate all possible implementations. Similar or identical elements are given consistent identifying numerals throughout the various figures.

DETAILED DESCRIPTION OF THE VARIOUS EMBODIMENTS

Figure 1:
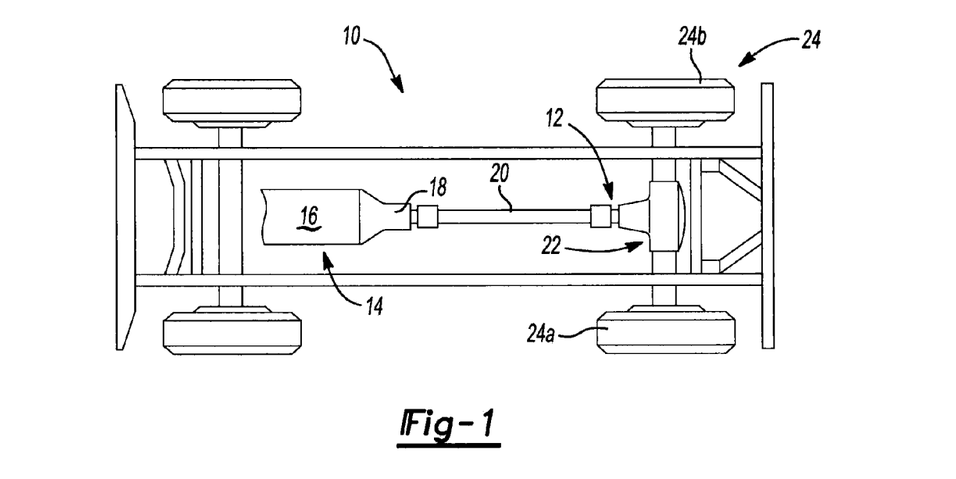
FIG. 1 is a schematic illustration of an exemplary vehicle having an axle assembly constructed in accordance with the teachings of the present disclosure.

With reference to FIG. 1 of the drawings, a vehicle having an axle assembly that is constructed in accordance with the teachings of the present disclosure is generally indicated by reference numeral 10. The vehicle 10 can include a driveline 12 that is drivable via a connection to a power train 14. The power train 14 can include an engine 16 and a transmission 18. The driveline 12 can include a propshaft 20, a rear axle assembly 22 and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The propshaft 20 can be coupled for rotation with the output of the transmission 18. Drive torque can be transmitted through the propshaft 20 to the rear axle assembly 22 where it can be selectively apportion in a predetermined manner to the left and right rear wheels 24a and 24b, respectively.

Figure 2:
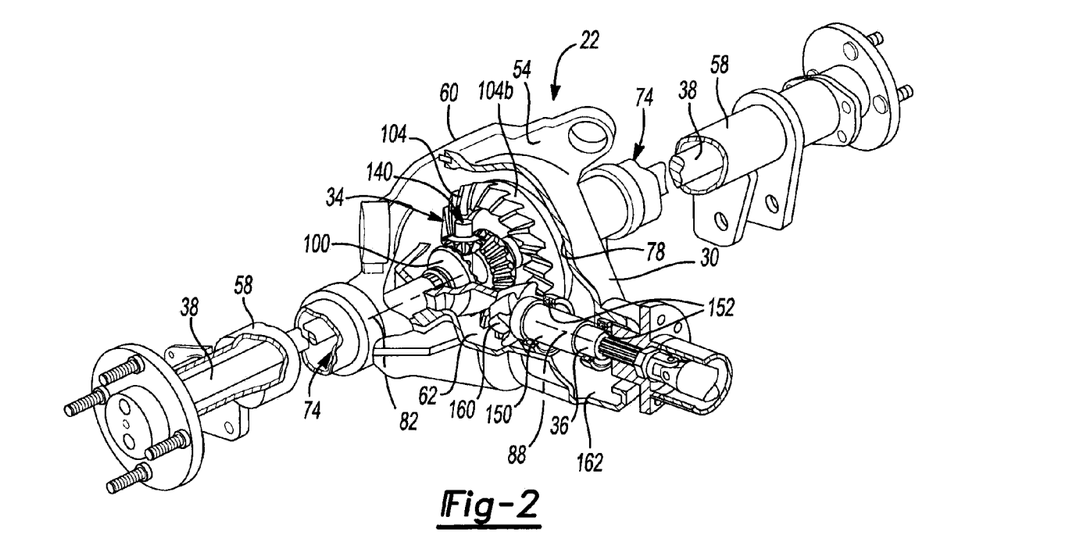
FIG. 2 is a perspective view of a portion of FIG. 1 illustrating the axle assembly in greater detail.

With reference to FIG. 2, the rear axle assembly 22 can include an axle housing assembly 30, a differential assembly 34, an input pinion assembly 36 and a pair of axle shafts 38. The axle housing assembly 30 is illustrated to be a Salisbury-type axle housing assembly, but it will be appreciated that the teachings of the present disclosure have application to other types of axle housing assemblies, including independent and banjo axle housing assemblies for front and rear axle assemblies. Moreover, those of ordinary skill in the art will appreciate that the axle housing assembly 30 could be configured for a front axle or a rear axle as desired. The axle housing assembly 30 can include a carrier housing 54, a pair of axle tubes 58 and a cover 60 and can include a first lubricant sump or reservoir 62.

Figure 3:
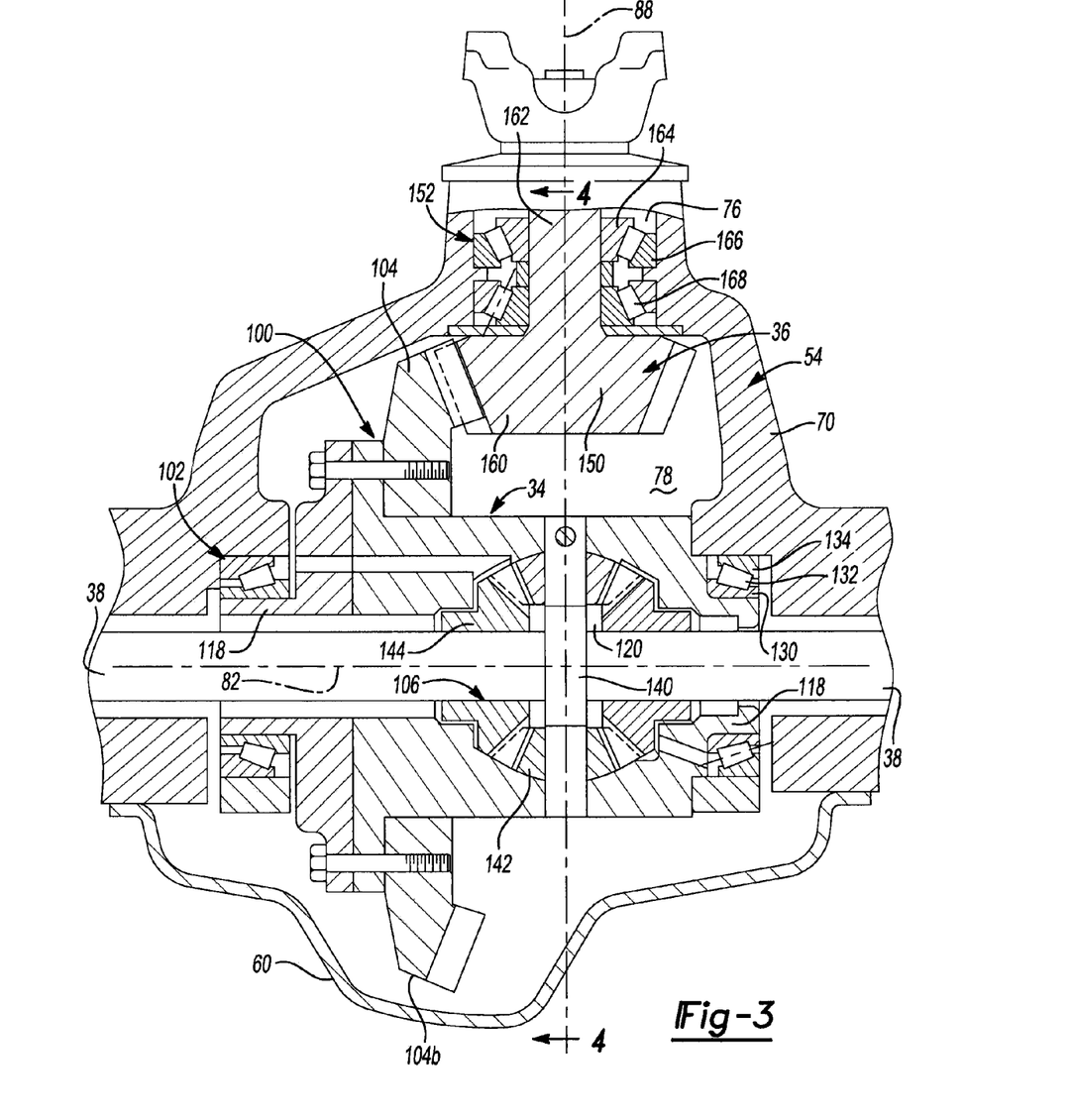
FIG. 3 is a sectional view taken along the line 3-3 of FIG. 4.
Figure 4:
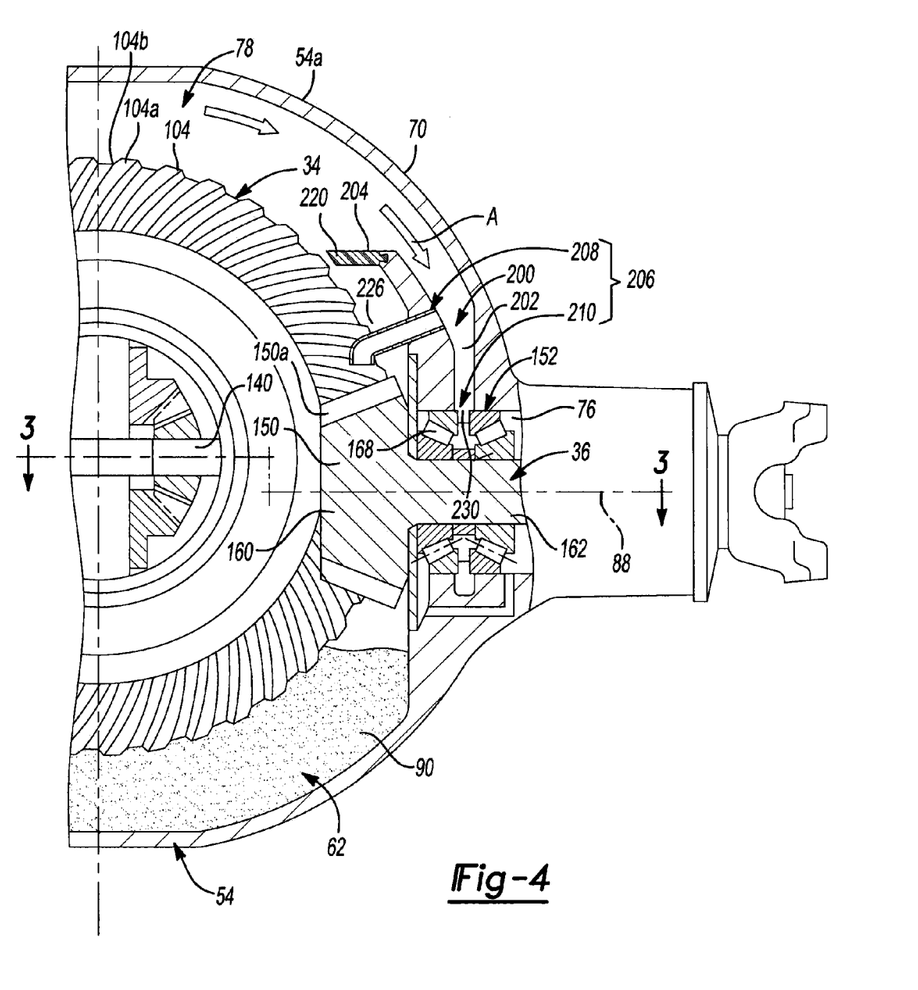
FIG. 4 is a sectional view taken along the line 4-4 of FIG. 2.

With additional reference to FIGS. 3 and 4, the carrier housing 54 can include a wall member 70 that can define a pair of tube bores 74, a pinion bore 76 and a differential cavity 78. The tube bores 74 can be aligned along a first axis 82 and can be sized to receive the axle tubes 58 therein. The pinion bore 76 can intersect the differential cavity 78 and can extend along a second axis 88 that can be generally perpendicular to the first axis 82. The cover 60 can be removably coupled to the carrier housing 54 to close an open end of the differential cavity 78. The carrier housing 54 and the cover 60 can cooperate to define the first sump 62, and a suitable lubricant 90 can be contained therein.

The differential assembly 34 can be any type of differential and can include a differential case 100, a pair of differential bearings 102, a ring gear 104 and a gear set 106. The differential case 100 can define a pair of trunnions 118 and a gear cavity 120 into which the gear set 106 can be received. The ring gear 104 can include a plurality of ring gear teeth 104a and can be coupled to the differential case 100 for rotation about the first axis 82. The trunnions 118 can be hollow structures that can extend from the opposite ends of the differential case 100.

The differential bearings 102 can be any type of bearings, such as tapered roller bearings, and can include an inner bearing race 130, a plurality of rollers 132, and an outer bearing race 134. The inner bearing race 130 of each differential bearing 102 can be coupled (e.g., press-fit) to a corresponding one of the trunnions 118. The outer bearing race 134 of each differential bearing 102 can be fixedly coupled to the carrier housing 54.

The gear set 106 can include a pinion shaft 140, which can extend through the differential case 100 generally perpendicular to the first axis 82, a pair of pinion gears 142, which can be rotatably mounted on the pinion shaft 140, and a pair of side gears 144 that can be in meshing engagement with the pinion gears 142. The side gears 144 can include an inner diameter having a plurality of spline teeth (not specifically shown) formed thereon.

The input pinion assembly 36 can be received in the pinion bore 76 in the carrier housing 54 and can include an input pinion 150 and a pair of pinion bearings 152. The input pinion 150 can include a pinion portion 160, which can be meshingly engaged to the ring gear 104, and a shaft portion 162. The pinion bearings 152 can be tapered roller bearings or angular contact ball bearings having an inner bearing race 164, an outer bearing race 166 and a plurality of rollers 168 disposed between the inner and outer bearing races 164 and 166. The pinion bearings 152 can be mounted on the shaft portion 162 and coupled to the carrier housing 54 to support the input pinion 150 for rotation about the second axis 88.

With reference to FIGS. 2 and 3, the axle shafts 38 can be received through the axle tubes 58 and can be coupled for rotation with the side gears 144 (e.g., via mating sets of spline teeth (not specifically shown) formed on the inside diameter of the side gears 144 and the outer diameter of a portion of the axle shafts 38).

With specific reference to FIG. 4, the axle housing assembly 30 can also include an auxiliary collecting means 200 that can include a second sump 202, a scraper 204 and a drain 206 with a first portion 208 and a second portion 210.

The second sump 202 can be formed by the wall member 70 and can be disposed within the differential cavity 78 in the carrier housing 54. In this regard, it will be appreciated that the wall member 70 can form at least a portion of an external surface 54a of the carrier housing 54, as well as all or a portion of the structure that forms the second sump 202.

Figure 5:
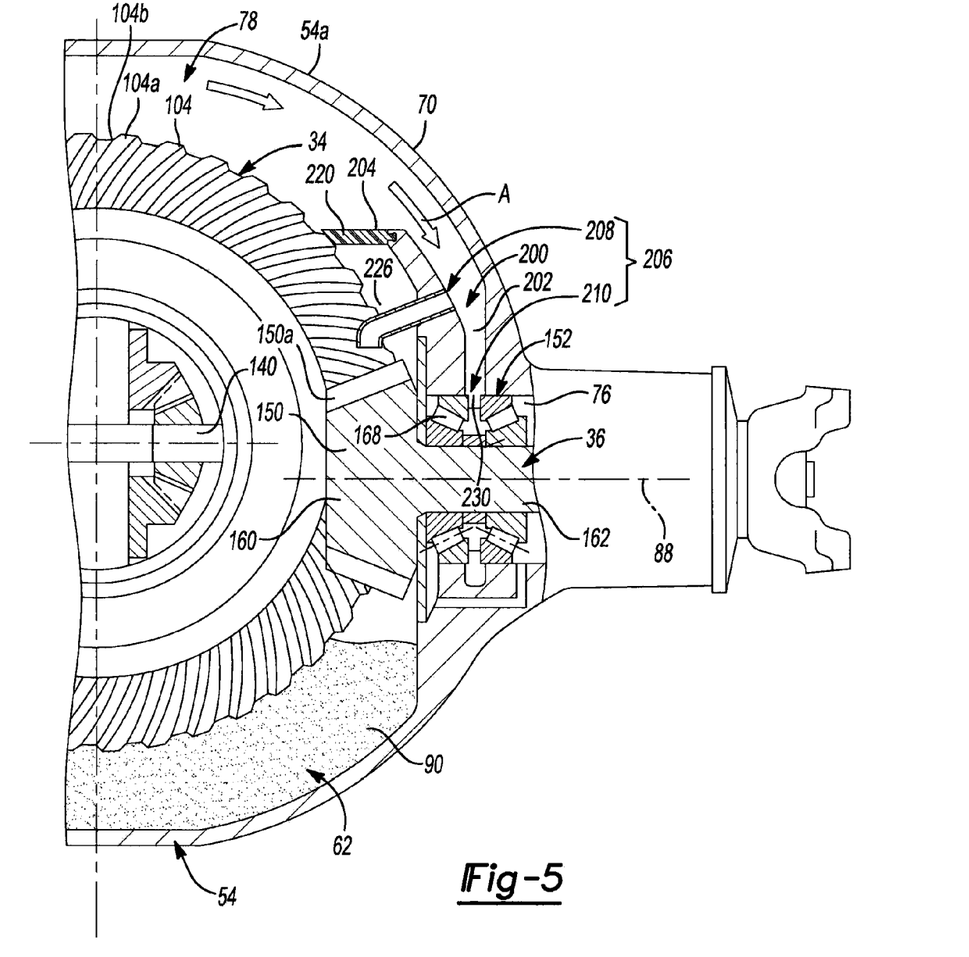
FIG. 5 is a view similar to that of FIG. 4 but illustrating a scraper that directly contacts a ring gear.

The scraper 204 can be coupled to or integrally formed with the wall member 70 and can extend outwardly from the second sump 202 toward a continuous annular surface 104b on the ring gear 104. A distal end 220 of the scraper 204 can terminate in close proximity to the continuous annular surface 104b of the ring gear 104 to scrape a portion of the lubricant 90 that clings to the ring gear 104 from the ring gear 104 as it rotates in a predetermined rotational direction (designated by arrow A). The scraper 204 and/or the wall member 70 can be configured to direct the scraped lubricant into the second sump 202. Alternatively, the distal end 220 of the scraper 204 can contact the continuous annular surface 104b as shown in FIG. 5 to more aggressively remove the clung lubricant from the ring gear 104.

Returning to FIG. 4, the first portion 208 of the drain 206 can be configured to at least partly drain the lubricant 90 in the second sump 202 directly onto the pinion teeth 150a of the pinion 150. In the particular example provided, the first portion 208 includes a tube member 226 that directs the lubricant 90 that flows therethrough directly onto the pinion teeth 150a. It will be appreciated, however, that the first portion 208 of the drain 206 could be configured in the alternative to dispense lubricant 90 from the second sump 202 directly onto the ring gear teeth 104a or to dispense such lubricant 90 onto both the pinion teeth 150a and the ring gear teeth 104a. It will also be appreciated that while the first portion 208 of the drain 206 has been illustrated as being a discrete tube member 226 that is coupled to the wall member 70, the first portion 208 of the drain 206 could be integrally formed with the wall member 70 or other structure that forms or partly forms the second sump 202. In this regard, the first portion 208 of the drain 206 could include a spout or one or more drain apertures from which the lubricant 90 can be dispensed.

The second portion 210 of the drain 206 can be configured to dispense a portion of the lubricant 90 in the second sump 202 to the pinion bearings 152 that support the pinion 150 for rotation within the carrier housing 54. The second portion 210 can include one or more apertures 230 that can be formed through the wall member 70 and intersect the pinion bore 76.

Figure 6:
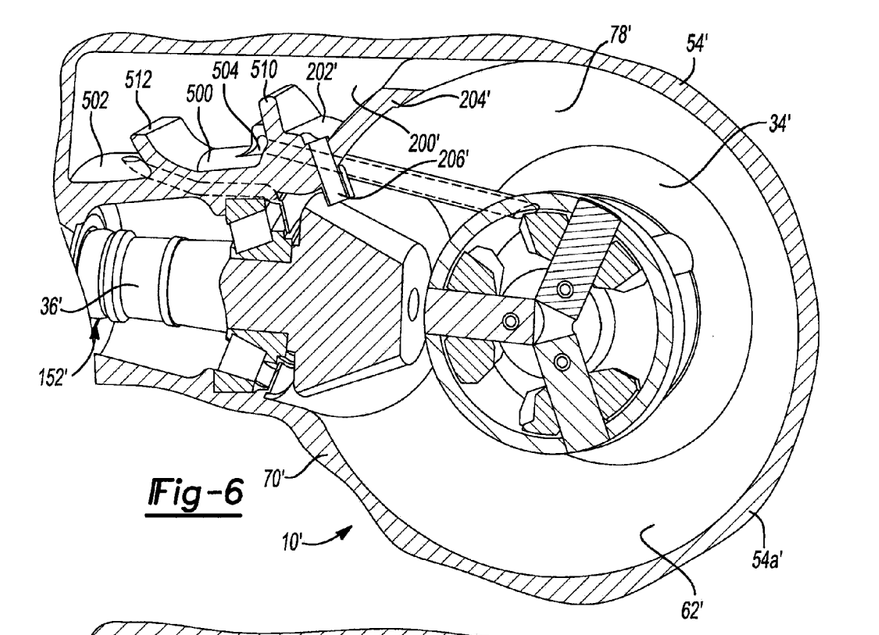
FIG. 6 is a section view of another axle assembly constructed in accordance with the teachings of the present disclosure, the view being taken through the axle housing on a first side of the rotational axis of the input pinion.
Figure 7:
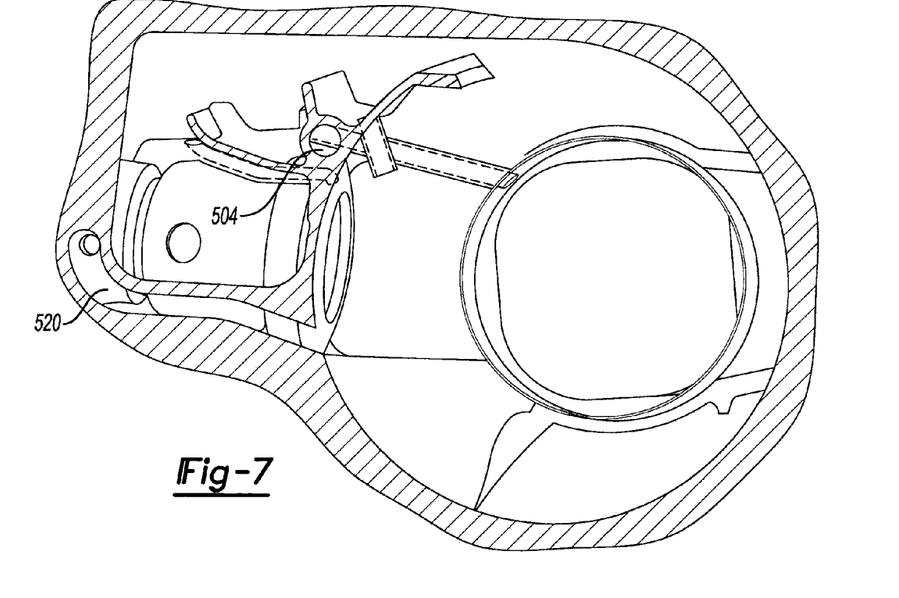
FIG. 7 is a section view of a portion of the axle assembly of FIG. 6, the view being taken through the axle housing on a second side of the rotational axis of the input pinion that is opposite the first side.

With reference to FIGS. 6 and 7, a portion of another axle assembly constructed in accordance with the teachings of the present disclosure is generally indicated by reference numeral 10'. The axle assembly 10' can include can include a carrier housing 54', a differential assembly 34' and an input pinion assembly 36'. The differential assembly 34' and the input pinion assembly 36' can be generally similar to the differential assembly 34 and the input pinion assembly 36 discussed above and as such, these components will not be described in further detail.

The carrier housing 54' can define a first sump 62' and an auxiliary collecting means 200' that can include a second sump 202', a scraper 204', a third sump 500, a fourth sump 502, and a first drain 206', a second drain 504 and a third drain 506. Each of the first sump 62', the second sump 202' and the scraper 204' can be configured in a manner that is similar to that which is described above and as such, these elements will not be described in further detail.

The third and fourth sumps 500 and 502 can be formed by the wall member 70' and can be disposed within the differential cavity 78' in the carrier housing 54'. In this regard, it will be appreciated that the wall member 70' can form at least a portion of an external surface 54a' of the carrier housing 54', as well as all or a portion of the structure that forms the third and fourth sumps 500 and 502. The third sump 500 can be disposed at an elevation that is slightly below that of the second sump 202' when the axle assembly 10' is disposed in an operating position. Similarly, the fourth sump 502 can be disposed at an elevation that is slightly below that of the third sump 500 when the axle assembly 10' is disposed in an operating position. The portion 510 of the wall member 70' that segregates the second and third sumps 202' and 500 can have a height that can be selected to permit the lubricant 90 that is received into the second sump 202' to spill over the portion 510 and into the third sump 500 when the second sump 202' is full. Similarly, the portion 512 of the wall member 70' that segregates the third and fourth sumps 500 and 502 can have a height that can be selected to permit the lubricant 90 that is received into the third sump 500 to spill over the portion 512 and into the fourth sump 502 when the third sump 500 is full. The second drain 504 can couple the third sump 500 to the bearings 102 (FIG. 3) in fluid connection to permit lubricant within the third sump 500 to lubricate the bearings (FIG. 3). The third drain 506 can couple the fourth sump 502 to the bearings 152' to permit the lubricant within the fourth sump 502 to lubricate the bearings 152'. A return passage 520 can be formed in the carrier housing 54' that can provide a path for the lubricant that is used to lubricate the tail bearing 152' (i.e., the bearing 152' that is furthest from the differential assembly 34').

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. An axle assembly comprising:
    an axle housing having an internal cavity, a portion of the internal cavity forming a first sump;
    a ring gear mounted in the internal cavity for rotation about a first axis, the ring gear being rotatable through the first sump to cause a lubricant in the first sump to cling to the ring gear;
    a differential coupled to the ring gear for rotation therewith about the first axis;
    a pinion mounted in the internal cavity of the axle housing for rotation about a second axis that is perpendicular to the first axis, the pinion including a plurality of teeth that are meshingly engaged to a plurality of teeth formed on the ring gear; and
    an auxiliary collecting means for collecting a portion of the lubricant that has clung to the ring gear as it rotates in a predetermined rotational direction through the first sump, the auxiliary collecting means having a second sump and a drain, the second sump being disposed in the internal cavity and being discrete from the first sump, the drain being configured to at least partly drain the second sump directly onto at least one of the teeth of the pinion and the teeth of the ring gear, the drain is also configured to dispense a portion of the lubricant in the second sump to a set of pinion bearings that support the pinion for rotation within the axle housing, the auxiliary collecting means having a third sump that is disposed in the internal cavity and which is discrete from the first and second sumps, the third sump configured to drain the lubricant therein to a set of differential bearings that support the differential for rotation within the internal cavity.

2. The axle assembly of claim 1, wherein the axle housing has a wall member that at least partly forms the second sump and at least a portion of an exterior surface of the axle housing.

3. The axle assembly of claim 2, wherein the drain includes a tubular member that is coupled to the wall member.

4. The axle assembly of claim 1, wherein the auxiliary collecting means includes a scraper that is configured to direct the portion of the lubricant that has clung to the ring gear from a surface of the ring gear into the second sump.

5. The axle assembly of claim 4, wherein the scraper contacts a surface of the ring gear as it rotates.

6. The axle assembly of claim 5, wherein the scraper is at least partly formed of a resilient material.

7. The axle assembly of claim 4, wherein the scraper is integrally formed with the axle housing.

8. The axle assembly of claim 1, wherein the auxiliary collecting means includes a fourth sump that is disposed in the internal cavity and which is discrete from the first, second and third sumps, the fourth sump configured to drain the lubricant therein to a second set of pinion bearings that support the pinion for rotation about the second axis.

9. A method for operating an axle assembly comprising:
    providing an axle housing having an internal cavity, a portion of the internal cavity forming a first sump;
    mounting a pinion in the axle housing, the pinion having a plurality of teeth;
    mounting a differential assembly in the axle housing, the differential assembly including a ring gear and a differential, the ring gear having a plurality of teeth that are meshingly engaged to the teeth of the pinion;

rotating the ring gear in a predetermined rotational direction through a lubricant in the first sump to cause the lubricant in the first sump to cling to the ring gear;

collecting a portion of the lubricant that has clung to the ring gear in a second sump that is elevated above the first sump;

draining a first portion of the lubricant in the second sump directly onto at least one of the teeth of the pinion and the teeth of the ring gear by dispensing the first portion of the lubricant into a tubular member; and draining a second portion of the lubricant in the second sump to a bearing set that supports the pinion for rotation within the axle housing.

10. The method of claim 9, wherein collecting the first portion of the lubricant that has clung to the ring gear includes contacting the lubricant that has clung to the ring gear with a scraper.

11. The method of claim 10, wherein the scraper contacts the ring gear.

12. The method of claim 11, wherein the scraper is at least partly formed of a resilient material.

13. An axle assembly comprising:

an axle housing having an internal cavity, a portion of the internal cavity forming a first sump;

a ring gear mounted in the internal cavity for rotation about a first axis, the ring gear being rotatable through the first sump to cause a lubricant in the first sump to cling to the ring gear;

a differential coupled to the ring gear and mounted by differential bearings in the internal cavity of the axle housing for rotation about the first axis;

a pinion mounted by pinion bearings in the internal cavity of the axle housing for rotation about a second axis that is perpendicular to the first axis, the pinion including a plurality of teeth that are meshingly engaged with teeth on the ring gear; and an auxiliary collecting means for collecting a portion of the lubricant that has clung to the ring gear as it rotates through the first sump, the auxiliary collecting means having a second sump, a third sump and a drain, the second sump being disposed in the internal cavity and being discrete from the first sump, the third sump being disposed in the internal cavity and being discrete from the first and second sumps, the drain being configured to at least partly drain the second sump directly onto the teeth of the pinion;

wherein the axle housing has a wall member that at least partly forms the second sump and at least a portion of an exterior surface of the axle housing;

wherein the drain includes a tubular member that is coupled to the wall member;

wherein the auxiliary collecting means includes a scraper that is configured to direct the portion of the lubricant that has clung to the ring gear from a surface of the ring gear into the second and third sumps; and wherein the drain is also configured to dispense a portion of the lubricant in the second sump to the pinion bearings and the third sump is configured to drain lubricant therein to the differential bearings.

14. An axle assembly comprising:

an axle housing having an internal cavity defining a first sump containing a lubricant;

a differential assembly including a differential case, differential bearings rotatably supporting said differential case for rotation in said internal cavity, and a ring gear fixedly secured for rotation with said differential case and being rotatably through said lubricant in said first sump;

an input pinion assembly including a pinion shaft, pinion bearings rotatably supporting said pinion shaft for rotation in said internal cavity, and a pinion gear driven by said pinion shaft and meshed with said ring gear; and a lubricant collection arrangement associated with said axle housing within said internal cavity for collecting a portion of said lubricant carried by said ring gear upon rotation through said first sump, said lubricant collection arrangement including a wall member of said axle housing defining second, third and fourth sumps that are discrete from said first sump and which are configured to receive lubricant released from said ring gear, a first drain for feeding lubricant from said second sump to an area of gear mesh between said ring gear and said pinion gear, a second drain for feeding lubricant from said third sump to said differential bearings, and a third drain for feeding lubricant from said fourth sump to said pinion bearings.

15. The axle assembly of claim 14 wherein said lubricant collection arrangement further includes a scraper extending outwardly from said wall member toward said ring gear and which is configured to direct lubricant that has clung to said ring gear into said second sump.

16. The axle assembly of claim 14 wherein a first portion of said wall member segregates said second and third sumps, and wherein a second portion of said wall member segregates said third and fourth sumps.

17. The axle assembly of claim 16 wherein said first portion of said wall member is configured to permit lubricant within said second sump to spill over into said third sump, and wherein said second portion of said wall member is configured to permit lubricant within said third sump to spill over into said fourth sump.

18. The axle assembly of claim 17 wherein said wall member is disposed above said pinion shaft and is configured such that said second sump is located at a higher elevation than said third sump while said third sump is located at a higher elevation than said fourth sump.

19. The axle assembly of claim 14 wherein said first drain includes a tube for delivering lubricant from said second sump directly onto at least one of said ring gear and said pinion gear in said area of gear mesh therebetween.

20. The axle assembly of claim 19 wherein said second drain includes a second tube extending between said third sump and an area in proximity to said differential bearings, and wherein said third drain includes a third tube extending between said fourth sump and an area in proximity to said pinion bearings.

21. An axle assembly comprising:

an axle housing having an internal cavity defining a first sump;

a differential rotatably mounted in said internal cavity for rotation about a first axis;

a ring gear fixed to said differential for common rotation about said first axis such that rotation of said ring gear through said first sump causes lubricant to cling to said ring gear;

a pinion rotatably mounted in said internal cavity for rotation about a second axis and having teeth that are meshed with teeth formed on said ring gear; and an auxiliary collecting arrangement configured to collect a portion of said lubricant that clings to said ring gear in response to rotation through said first sump, said auxiliary collecting arrangement including second, third and fourth sumps that are discrete from said first sump and configured to collect lubricant released from said ring gear, a first drain configured to drain lubricant from said second sump onto said teeth of at least one of said pinion and said ring gear, a second drain configured to drain lubricant from said third sump to bearings that rotatably support one of said pinion and said differential for rotation within said internal cavity, and a third drain configured to drain lubricant from said fourth sump to bearings that rotatably support the other of said pinion and said differential, wherein said second, third and fourth sumps are associated with a wall member of said axle housing located above said pinion, said wall member having a first portion segregating said second sump from said third sump and a second portion segregating said third sump from said fourth sump.

22. The axle assembly of claim 21 wherein said auxiliary collecting arrangement further includes a scraper coupled to said wall member and which extends outwardly relative to said second sump so as to be located in close proximity to said teeth of said ring gear.

23. An axle assembly comprising:
an axle housing having an internal cavity defining a first sump;
a differential rotatably mounted in said internal cavity for rotation about a first axis;
a ring gear fixed to said differential for common rotation about said first axis such that rotation of said ring gear through said first sump causes lubricant to cling to said ring gear;
a pinion rotatably mounted in said internal cavity for rotation about a second axis and having teeth that are meshed with teeth formed on said ring gear; and
an auxiliary collecting arrangement configured to collect a portion of said lubricant that clings to said ring gear in response to rotation through said first sump, said auxiliary collecting arrangement including second and third sumps that are discrete from said first sump and configured to collect lubricant released from said ring gear, a first drain configured to drain lubricant from said second sump onto said teeth of at least one of said pinion and said ring gear, and a second drain configured to drain lubricant from said third sump to bearings that rotatably support one of said pinion and said differential for rotation within said internal cavity, wherein said second and third sumps are associated with a wall member of said axle housing, said wall member includes a wall portion segregating said third sump from said second sump and a scraper extending outwardly relative to said second sump so as to be located in close proximity to said ring gear.

* * * * *